Aug. 18, 1964 G. R. REID ET AL 3,145,260

METHOD AND MEANS FOR ELECTRICAL CONNECTION

Filed Aug. 4, 1961

INVENTORS
GILBERT R. REID
JACOB MUELLER
FRANCIS B. HANNON
BY
Fred [signature]
ATTORNEY United States Patent Office 3,145,260
Patented Aug. 18, 1964

3,145,260
METHOD AND MEANS FOR ELECTRICAL CONNECTION

Gilbert R. Reid, Camden, N.J., and Jacob Mueller, Philadelphia, and Francis B. Hannon, King of Prussia, Pa., assignors to Sperry Rand Corporation, New York, N.Y., a corporation of Delaware Filed Aug. 4, 1961, Ser. No. 129,398
7 Claims. (Cl. 174—72)

This invention relates to means for electrically and mechanically connecting a plurality of wires together and, in addition, relates to a new method for connection of electrical wires.

Electrical connections, generally, fall in two different distinct categories: "permanent" and "temporary" connections. "Temporary" connections are usually performed by permanently affixing individual wires to separate connectors, which connectors are then temporarily connected or mated to each other. Such connectors of the prior art, usualy, are relatively expensive and tend to be unreliable because of occasional intermittent electrical connection. "Permanent" connections are performed by permanently connecting wires together by means of a connector, which wires, or connections, may or may not be soldered together. In the past, such connections were quite often unreliable; intermittent connections often resulted from "cold" solder joints or poor physical connection. Cable connectors of the prior art, which were relatively intermittent-free, generally were extremely expensive.

It is, therefore, an object of this invention to provide a novel means for connecting cables or wires together, the resulting connection being intermittent-free and relatively inexpensive.

Another object of this invention is to provide a new method for electrically connecting a plurality of wires together.

Still another object of this invention is to provide a novel solderless electrical connection which is substantially smaller in size than conventional type connectors.

Yet another object of this invention is to provide a novel electrical connection which has multiple electrical paths.

In accordance with one embodiment of this invention, a T connector of suitable conductive material, such as half-hard brass, is provided having crimpable terminals at the three ends of the T. Three wires are electrically connected to each other by coupling each wire to two different terminals of the T wherein each terminal encompasses two of the wires.

The novel features of this invention and other objects and advantages thereof, together with its organization and method of operation, will become more apparent from the following description, when read in connection with the accompanying drawings, in which:

FIGS 1*a* and 1*b* are plan and end views, respectively, of a T connector;

When wires or cables are referred to in this specification, it is meant to include wires of the single conductor category, wires which are inner conductors of co-axial cables, and wires of multi-conductor cables.

The use of a T connector, per se, for connecting wires together is not new. In the prior art, however, wires were connected by having one terminal of the T connector crimped over one wire and one wire only. Contrariwise, in accordance with this invention, electrical connections are provided with multiple conductive paths.

Figure 1A:
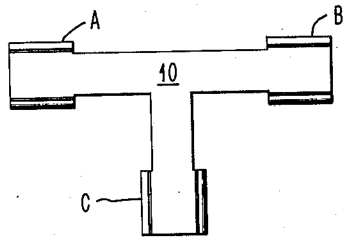
Figure 1B:
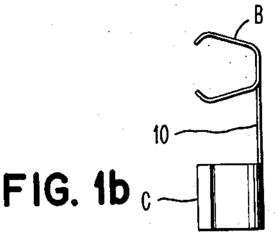
Figures 2, 3, 4, 5:
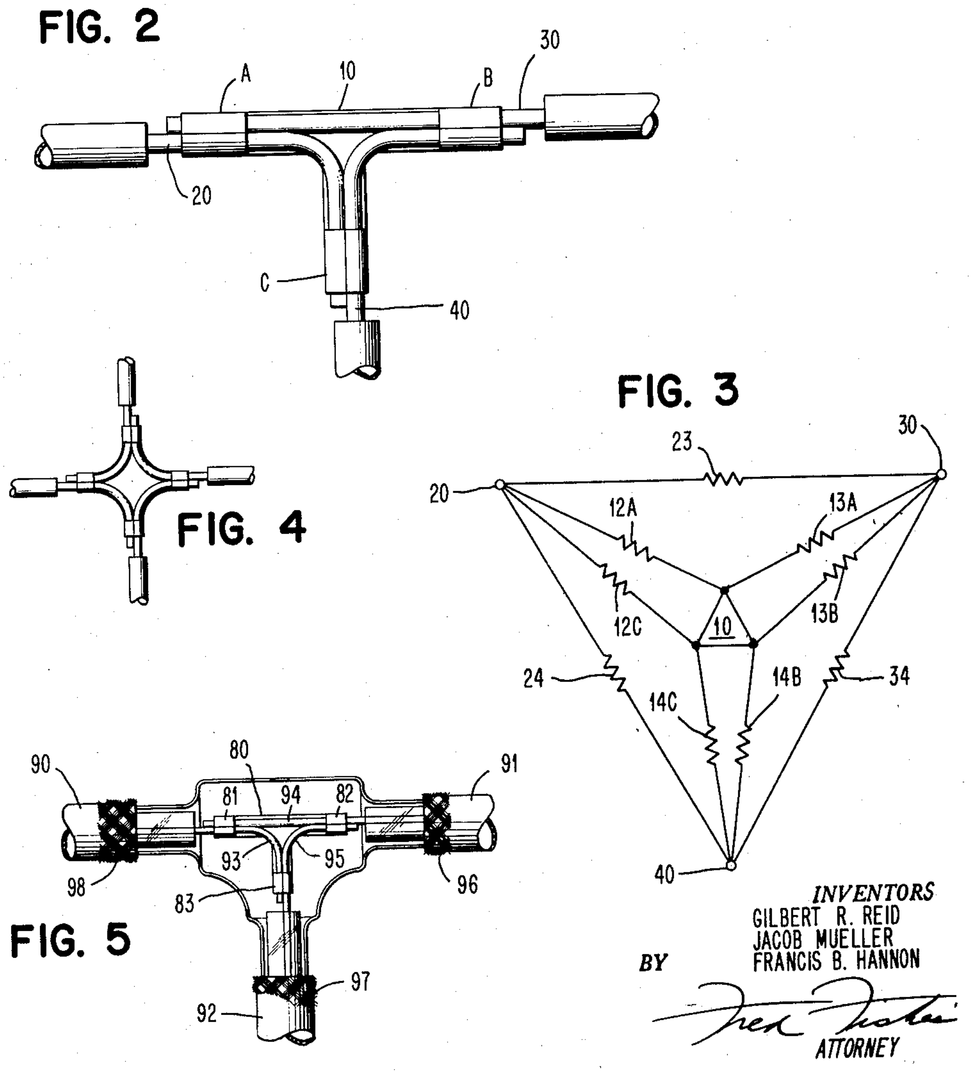
FIG. 2 is a diagrammatical illustration showing the method of connecting three cables together by a T connector in accordance with one embodiment of this invention.
FIG. 3 is an equivalent electrical diagram of the cable connections shown in FIG. 2.
FIG. 4 is a diagram showing four cables coupled together in accordance with another embodiment of this invention.
FIG. 5 is an illustration of inner conductors of three co-axial cables connected together in accordance with the teachings of this invention.

Three cables 20, 30, and 40, as shown in FIG. 2, are electrically connected to each other by means of a T connector 10, shown in FIGS. 1*a* and 1*b*. One terminal A of the T connector 10 is mechanically crimped to join the cables 20 and 30 together. A second terminal B of the connector 10 is mechanically crimped to join the cables 30 and 40 together; a third terminal C of the T connector 10 is mechanically crimped to join the cables 20 and 40 together. The mechanical crimping of three terminals provides a reliable electrical connection among each of the three wires without soldering.

FIG. 3 shows the electrical equivalency of the connections shown in FIG. 2. A resistance 23 is equivalent to the resistance that directly occurs between the wires 20 and 30 at their point of contact in the proximity of the terminal A (if these cables do not contact each other, the resistance 23, in effect, is extremely high). A resistance 34, which connects the cable 30 to the cable 40 is the resistance between these cables 30 and 40 that occurs in the proximity of the terminal B of the T connector 10. The resistance 24, which is the equivalent resistance at the point of contact between the cables 20 and 40, occurs in the vicinity of the terminal C.

An equivalent resistance 12A exists between the cable 20 and the connector 10 at the terminal A; an equivalent resistance 12C is present between the cable 20 and the connector 10 at the terminal C. An equivalent resistance 13A exists between the cable 30 and the connector 10 at the terminal A; an equivalent resistance 13B exists between the cable 30 and the terminal B of the connector 10. Similarly, equivalent resistances 14B and 14C exist between the cable 40 and the T connector 10 at the terminals B and C, respectively.

Electrical conduction exists among the terminals 20, 30, and 40 in a plurality of conductive paths. Electrical conduction exists between the cables 20 and 30 in any one or more (or all) of the following resistive paths:

23
12A–13A
12A–13B
12A–14C–34
12A–14B–34
12C–13A
12C–13B
12C–14C–34
12C–14B–34
24–14C–13A
24–14C–13B
24–14B–13A
24–14B–13B
24–34

As shown from the list above, electrical conduction can exist between the wires 20 and 30 in any one of fourteen different paths, so that, in the event any one path is open, current can travel in other paths. For example, referring to FIG. 2, assume that the terminal A was poorly crimped so as to be 100% ineffectual, and that the terminals B and C were crimped properly, current then can travel through any one or more of 13 different paths. Current can travel through, in such event, by way of the terminals B and C. For example, current can travel from the cable 20 directly to the connector 10 at the terminal C and from the terminal B can directly travel to the cable 30. Current can also travel from the cable 20 to the cable 40 either directly or via the connector 10 at the terminal C and then, along the cable 40 to the cable 30 either directly or via the cable 10 at the connection point B.

Therefore, it is shown that the connections described are much more reliable than other connections of the prior art.

As shown in FIG. 4, a connector having four crimpable terminals reliably can mechanically and electrically connect four cables together wherein each cable is crimped by two separate terminals and each terminal crimps two different cables.

Referring to FIG. 5, there is shown three coaxial cables 90, 91 92 with the inner conductors 93, 94, 95 connected together by the terminals 81, 82, 83, of a small T connector 80 in the manner described above with regard to FIG. 2. The external braid 96, 97, 98 of the cables 91, 92, 90 can be connected together by suitable means, such as described, for example, in a copending application entitled "Method and Means for Connecting Co-Axial Cables," filed August 4, 1961, Serial No. 129,462, and assigned to the common assignee of this application.

Various modifications will be apparent to those skilled in the art. It is desired, however, that this invention be limited solely by the scope of the appended claims.

One modification, for example, is to apply an equivalent shape to the T connector. For example, Y connectors can be used with similar results. The use of the term "T connector " in the claims includes such variations as a Y connector.

What is claimed is:

1. In combination, a plurality of electrical conductors, and a conductive connector having a like plurality of crimpable terminals, each of said terminals being crimped to mechanically and electrically join a different pair of said conductors together, each of said conductors being mechanically and electrically joined by a pair of said terminals, whereby said electrical conductors are electrically interconnected by a plurality of condutive paths.

2. The combination as claimed in claim 1 wherein said connector is a T connector.

3. The combination as claimed in claim 1 wherein one of said conductors is an inner conductor of a coaxial cable.

4. The combination as claimed in claim 1 wherein all of said conductors are each an inner condutor of a coaxial cable.

5. In combination $n$ electrical conductors, and a conductive connector having $n$ crimpable terminals, one of said terminals being crimped to mechanically and electrically join a first and a second of said conductors together, a second of said terminals being crimped to mechanically and electrically join said second and a third of said conductors together, and an $n$th of said terminals being crimped to mechanically and electrically join an $n$th and said first of said conductors together, whereby said electrical conductors are electrically interconnected by a plurality of conductive paths, wherein $n$ is an integer greater than 2.

6. The method of electrically connecting a plurality of conductors together including the steps providing a conductive connector having a like plurality of crimpable connecting means, sorting said conductors into a like plurality of different pairs of conductors, arranging and engaging each of said different pairs of conductors with a separate one of said crimpable connection means and each of said conductors with two different connection means, and crimping each of said connection means about its different pair of said conductors, whereby each of said conductors is crimped by a different pair of said connection means.

7. The method of electrically connecting $n$ conductors together including the steps providing a conductive connector having $n$ crimpable connection means, sorting said conductors into $n$ different pairs of conductors, arranging and engaging each of said different pairs of conductors with a separate one of said crimpable connection means, crimping a first of said means about a first and a second of said conductors, crimping a second of said means about said second and a third of said conductors, and crimping an $n$th of said means about the $n$th and said first of said conductors, wherein $n$ is an integer greater than 2.

References Cited in the file of this patent

UNITED STATES PATENTS

| | | |
|---|---|---|
| 567,059 | Wolf | Sept. 1, 1896 |
| 704,869 | Fischer et al. | July 15, 1902 |
| 1,559,668 | Brown et al. | Nov. 3, 1925 |
| 2,427,285 | Kershaw | Sept. 9, 1947 |
| 2,451,393 | Kershaw | Oct. 12, 1948 |
| 2,760,798 | Evans | Aug. 28, 1956 |
| 2,930,113 | Greco | Mar. 29, 1960 |

FOREIGN PATENTS

| | | |
|---|---|---|
| 448,789 | France | Dec. 6, 1912 |
| 189,203 | Great Britain | Nov. 23, 1922 |